(12) United States Patent
Gutta et al.

(10) Patent No.: US 7,183,944 B2
(45) Date of Patent: Feb. 27, 2007

(54) VEHICLE TRACKING AND IDENTIFICATION OF EMERGENCY/LAW ENFORCEMENT VEHICLES

(75) Inventors: Srinivas Gutta, Buchanan, NY (US); Miroslav Trajkovic, Ossining, NY (US); Antonio Colmenarez, Jr., Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 981 days.

(21) Appl. No.: 09/879,698

(22) Filed: Jun. 12, 2001

(65) Prior Publication Data

US 2002/0186201 A1 Dec. 12, 2002

(51) Int. Cl.
*G08G 1/07* (2006.01)
(52) U.S. Cl. .................................... 340/937; 348/148
(58) Field of Classification Search ............... 348/148; 340/937; 382/103, 104, 105; 701/117
See application file for complete search history.

(56) References Cited

U.S. PATENT DOCUMENTS

| 4,881,270 | A | * | 11/1989 | Knecht et al. ............. 382/191 |
| 4,992,866 | A | * | 2/1991 | Morgan ...................... 348/159 |
| 5,121,200 | A | | 6/1992 | Choi |
| 5,598,207 | A | * | 1/1997 | Kormos et al. ............ 348/148 |
| 5,657,246 | A | * | 8/1997 | Hogan et al. .............. 348/14.1 |
| 5,680,123 | A | * | 10/1997 | Lee ............................ 340/937 |
| 5,706,362 | A | | 1/1998 | Yabe |
| 5,761,326 | A | * | 6/1998 | Brady et al. ............... 382/103 |
| 5,774,841 | A | * | 6/1998 | Salazar et al. ............. 704/225 |
| 5,801,943 | A | * | 9/1998 | Nasburg ..................... 701/117 |
| 5,835,880 | A | | 11/1998 | Gan et al. |
| 5,847,755 | A | | 12/1998 | Wixson et al. |
| 5,892,855 | A | * | 4/1999 | Kakinami et al. ......... 382/291 |
| 6,289,140 | B1 | * | 9/2001 | Oliver ........................ 382/313 |
| 6,323,898 | B1 | * | 11/2001 | Koyanagi et al. ......... 348/169 |
| 6,396,535 | B1 | * | 5/2002 | Waters ....................... 348/159 |
| 6,535,242 | B1 | * | 3/2003 | Strumolo et al. .......... 348/148 |
| 6,553,130 | B1 | * | 4/2003 | Lemelson et al. ......... 382/104 |
| 6,593,960 | B1 | * | 7/2003 | Sugimoto et al. .......... 348/148 |
| 2001/0038344 | A1 | * | 11/2001 | Garcia ........................ 340/902 |
| 2002/0005778 | A1 | * | 1/2002 | Breed et al. ................ 340/435 |
| 2003/0122930 | A1 | * | 7/2003 | Schofield et al. .......... 348/148 |

OTHER PUBLICATIONS

The American Heritage Dictionary of the English Language: Fourth Edition, 2000) definition of "icon".*
Elgammal, et al., Non-parametric Model for Background Subtraction , Computer Vision—ECCV 2000, Lecture Notes in Computer Science 1843.
Raja, et al., "Segmentation and Tracking Using Colou Mixture Models", Computer Vision—ACCV'98, Lecture Notes in Science 1351.

* cited by examiner

*Primary Examiner*—Jeffery Hofsass
*Assistant Examiner*—Anne V. Lai

(57) ABSTRACT

An apparatus for detecting an emergency/law enforcement vehicle from a secondary vehicle. The apparatus includes: at least one camera mounted on the secondary vehicle; a display surface mounted inside an interior of the secondary vehicle for displaying video image data from the at least one camera; at least one of a pan, tilt, and zoom motor operatively connected to the at least one camera for providing an enhanced view of an emergency/law enforcement vehicle displayed on the display surface; and a controller for controlling the at least one pan, tilt, and zoom motors to provide the enhanced view. The apparatus alternatively also has the capability to detect, track and/or classify an emergency/law enforcement vehicle in the video image data.

13 Claims, 3 Drawing Sheets

VEHICLE TRACKING AND IDENTIFICATION OF EMERGENCY/LAW ENFORCEMENT VEHICLES

BACKGROUND OF THE INVENTION

1. Field of the Invention

The present invention relates generally to object tracking and classification, and more particularly, to tracking and classification of emergency/law enforcement vehicles which is defined for the purposes of this disclosure to be any type of vehicle (road, rail, air, water, etc.) for which other vehicles must or should yield the right of way or take other appropriate action).

2. Prior Art

It is imperative that emergency/law enforcement vehicles be given a clear right of way on the roadways so that they are not delayed in providing emergency care or service to the public. It is mandatory for vehicles in the right of way of emergency/law enforcement vehicles to yield to such vehicles, generally by pulling over to the side of the road until such vehicles pass.

Therefore, driver awareness is very important so that a driver can yield the right of way to an approaching emergency/law enforcement vehicle. However, there are situations where driver awareness is compromised by conditions caused by the driver or those conditions not under the control of the driver. For instance, a driver could be listening to loud music or talking on a cellular telephone and not able to hear the sirens of an approaching emergency/law enforcement vehicle. Similarly, in a noisy environment, a driver may not be able to hear the sirens of an approaching emergency/law enforcement vehicle. Furthermore, a driver may also not see an approaching emergency/law enforcement vehicle because of an obstruction in the road, such a sharp bend, or the emergency/law enforcement vehicle may be in a "blindspot" in the driver's rear mirrors.

For these reasons there is a need in the art for an apparatus for detecting an approaching emergency/law enforcement vehicle from a secondary vehicle (e.g., a passenger or commercial vehicle sharing the road with the emergency/law enforcement vehicle).

SUMMARY OF THE INVENTION

Therefore it is an object of the present invention to provide a method and apparatus for tracking and classifying emergency/law enforcement vehicles which overcomes the problems of driver awareness to such vehicles.

Accordingly, an apparatus for detecting an emergency/law enforcement vehicle from a secondary vehicle is provided. In a first variation, the apparatus comprises: at least one camera mounted on the secondary vehicle; a display surface mounted inside an interior of the secondary vehicle for displaying video image data from the at least one camera; at least one of a pan, tilt, and zoom motor operatively connected to the at least one camera for providing an enhanced view of an emergency/law enforcement vehicle displayed on the display surface; and control means for controlling the at least one pan, tilt, and zoom motors to provide the enhanced view.

Preferably, all of the pan, tilt, and zoom motors are operatively connected to the at least one camera. More preferably, the at least one camera comprises forward and rearward facing cameras, each of which are operatively connected to a pan, tilt and zoom motor, and each of which have a control means for controlling their respective pan, tilt, and zoom motors.

The first variation of the apparatus preferably further comprises selection means for selecting the display of video image data from one of the forward and rearward facing cameras for display on the display surface. More preferably, both the video image data from the forward and rearward facing cameras are displayed together on the display surface. In which case the selection means comprises a touch screen whereby touching the display from one of the forward or rearward facing cameras selects the corresponding video image data for display on the display surface.

Preferably, the control means comprises a touch screen whereby touching a portion of the display surface controls at least one of the pan, tilt, and zoom motors to provide an enhanced view of the portion touched. Alternatively, the control means comprises a speech recognition and command system for recognizing a spoken command by a user and for controlling at least one of the pan, tilt, and zoom motors accordingly.

In a second variation of the apparatus for detecting an emergency/law enforcement vehicle from a secondary vehicle, the same comprises: at least one camera mounted on the secondary vehicle; a display surface mounted inside an interior of the secondary vehicle for displaying video image data from the at least one camera; tracking means for tracking an identified emergency/law enforcement vehicle displayed on the display surface; and identification means for indicating the emergency/law enforcement vehicle to be tracked.

Preferably, the identification means comprises a touch screen whereby touching a portion of the display surface indicates the portion of the display which contains the emergency/law enforcement vehicle to be tracked.

In a third variation of the apparatus for detecting an emergency/law enforcement vehicle from a secondary vehicle, the same comprises: at least one camera mounted on the secondary vehicle; a display surface mounted inside an interior of the secondary vehicle for displaying video image data from the at least one camera; classification means for classifying vehicles in the video image data and identifying those of the classified vehicles which are emergency/law enforcement vehicles; and tracking means for tracking the identified emergency/law enforcement vehicle in the video image data.

Preferably, the third variation of the apparatus of the present invention further comprises means for alerting a user of the secondary vehicle that at least one emergency/law enforcement vehicle has been identified in the video image data. The means for alerting the user preferably comprises an audible and/or visual alarm operatively connected to one of the classification or tracking means.

The second and third variations of the apparatus of the present invention preferably further comprise at least one of a pan, tilt, and zoom motor operatively connected to the at least one camera for providing an enhanced view of an emergency/law enforcement vehicle displayed on the display surface, wherein the tracking means is operatively connected to at least one of the pan, zoom, and tilt motors for controlling the same.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Figure 1:
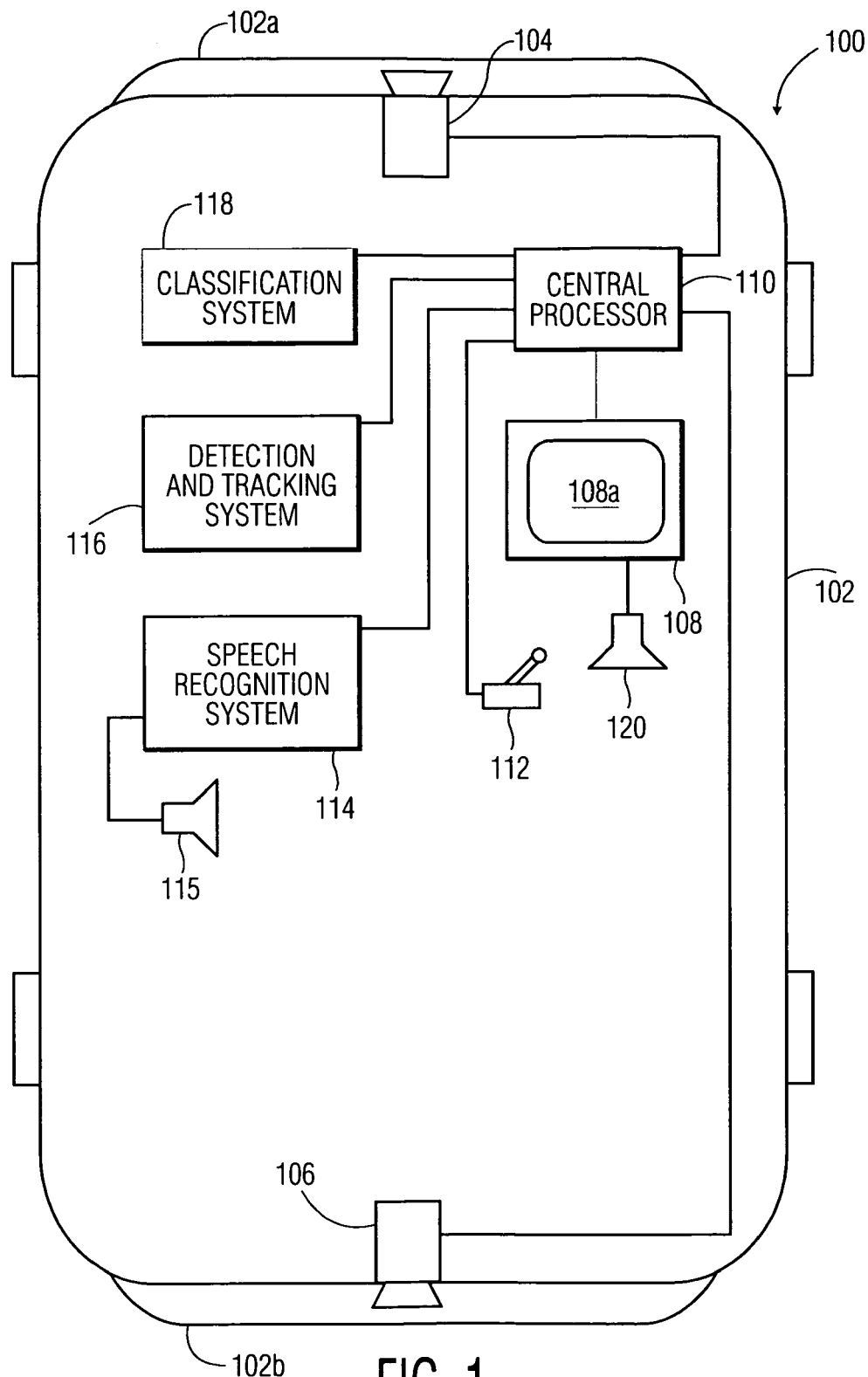
FIG. 1 illustrates a schematic view of a preferred implementation of the apparatus of the present invention in a land vehicle.

Referring now to FIG. 1, there is illustrated a schematic view of a preferred implementation of the apparatus for detecting an approaching emergency/law enforcement vehicle from a secondary vehicle according to the present invention. The apparatus and its variations discussed below are referred to herein generally by reference numeral 100. Although the apparatus 100 is shown configured to a land vehicle 102, such as a passenger car, the invention is not so limited. As discussed above, the apparatus of the present invention can be configured to any type of vehicle, such as, land, air, water, or rail, without departing from the scope or spirit of the present invention.

In a first variation of the apparatus of the present invention, the same comprises at least one camera 104 mounted on the vehicle 102 (vehicle 102 is alternatively referred to herein as the secondary vehicle). Since vehicle 102 is moving in the direction indicated by arrow A, camera 104 is referred to as a forward facing camera 104 and captures video image data from the front side 102a of the vehicle 102. Preferably, the apparatus 100 also comprises a rearward facing camera 106 for capturing video image data from the rear side 102b of the vehicle 102. At least one of the forward and rearward facing cameras 104, 106, and preferably both have at least one of a pan, tilt, and zoom motor operatively connected to their respective camera. Cameras having such motors are generally packaged as a single unit, as illustrated, and are well known in the art. Because of the pan, tilt, and/or zoom capabilities of the cameras 104, 106, an enhanced view of an emergency/law enforcement vehicle can be provided. For purposes of this disclosure an enhanced view means that a display of the emergency/law enforcement vehicles can be enlarged (zoomed) and/or its location on the display changed such as being centered in the display (pan and tilt).

Apparatus 100, also comprises a display surface 108 mounted inside an interior of the vehicle 102 for displaying video image data from the forward and/or rearward facing cameras 104, 106 on a display 108a. The display surface can be any type known in the art such as CRT or LCD and can be color or black and white. The display surface 108 can be directly connected to the outputs of the forward and/or rearward facing cameras 104, 106 or preferably, as shown in FIG. 1, connected by way of a central processor 110.

Apparatus 100 further comprises a control means for controlling the at least one pan, tilt, and zoom motors of the cameras 104, 106 to provide the enhanced view of the emergency/law enforcement vehicle. In the first variation of the apparatus 100 of the present invention the control means is a manual control means and can be any type known in the art for manually controlling the pan, tilt, and zoom motors of a camera, such as by a joystick 112 operatively connected to the cameras 104, 106 either directly or by way of the central processor 110. Alternatively, the control means can comprise a speech recognition and command system 114 having a microphone 115 for recognizing a spoken command by a user of the vehicle 102. The speech recognition and command system 114 recognizes a spoken command by the user of the vehicle 102 and controls at least one of the pan, tilt, and zoom motors of the cameras 104, 106, accordingly.

Figure 2:
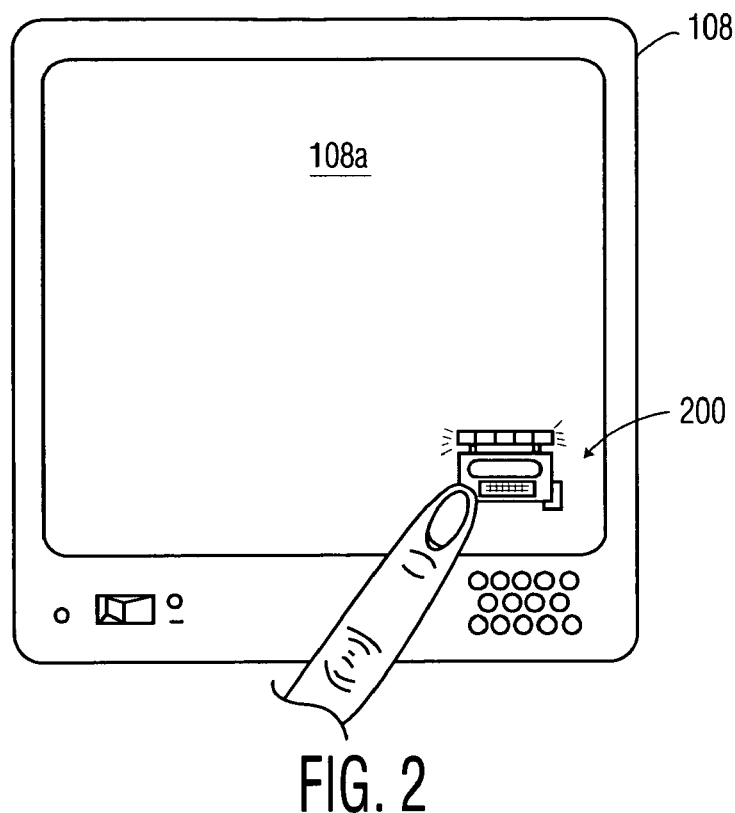
FIG. 2 illustrates a preferred display surface for use in the apparatus of the present invention in which an emergency vehicle is displayed in a lower right corner thereof.
Figure 3:
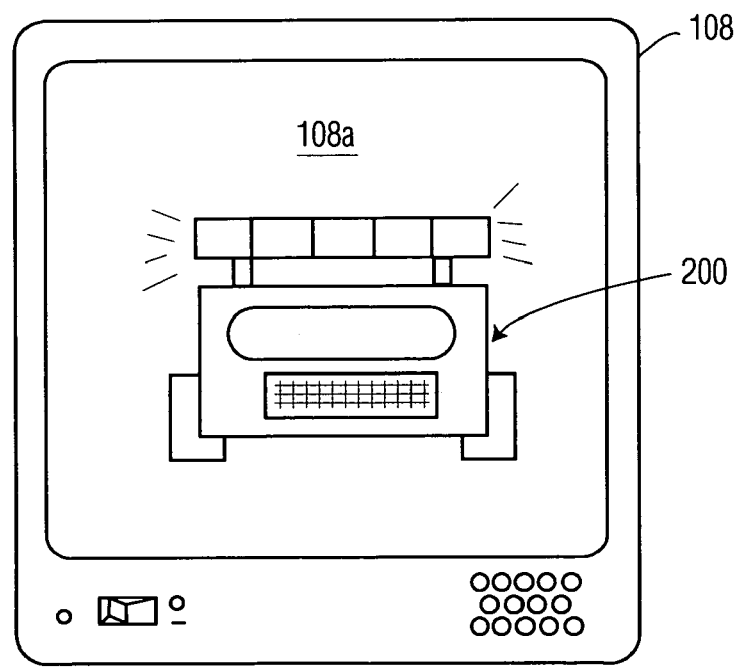
FIG. 3 illustrates the display surface of FIG. 2 wherein the display of the emergency vehicle is enhanced by enlarging and centering the display of the same on the display surface.

However, the control means preferably comprises the display surface 108 having a touch screen capability whereby touching a portion of the display 108a controls at least one of the pan, tilt, and zoom motors to provide an enhanced view of the portion touched. Such is illustrated with reference to FIGS. 2 and 3. FIG. 2 illustrates the display surface 108 of FIG. 1, having video image data from the rearward facing camera 106 displayed thereon. What appears to be an emergency/law enforcement vehicle 200 is visible in the lower right corner of the display 108a. By touching the lower right hand corner of the display 108a, that portion of the display 108a is enhanced. FIG. 3 illustrates an example of how the lower right corner of the display 108a of FIG. 2 is enhanced. By touching the lower right corner of the display 108a, an instruction is sent either directly to the pan, zoom, and tilt motors of the rearward facing camera 106 or to the pan, zoom, and tilt motors of the rearward facing camera 106 via the central processor 110 (as is shown in FIG. 1) to control at least one of the pan, tilt, and zoom motors to enhance the view of the touched portion.

For example, as shown in FIG. 3, the rearward facing camera 106 is panned and tilted to center the portion containing the emergency/law enforcement vehicle in the display 108a and it is further zoomed to enlarge the emergency/law enforcement vehicle in the display 108a. In this way, a user/driver of the vehicle can confirm whether or not an approaching vehicle is an emergency/law enforcement vehicle for which the driver must yield the right of way.

Figure 4:
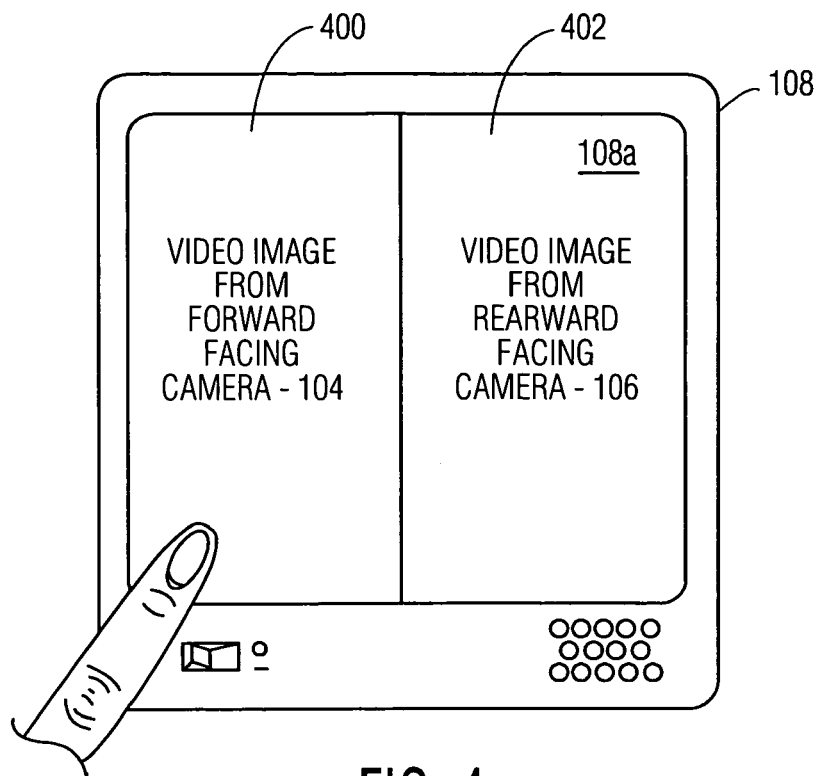
FIG. 4 illustrates the display surface having a side-by-side display of the video image data from the forward and rearward facing cameras.
Figure 5:
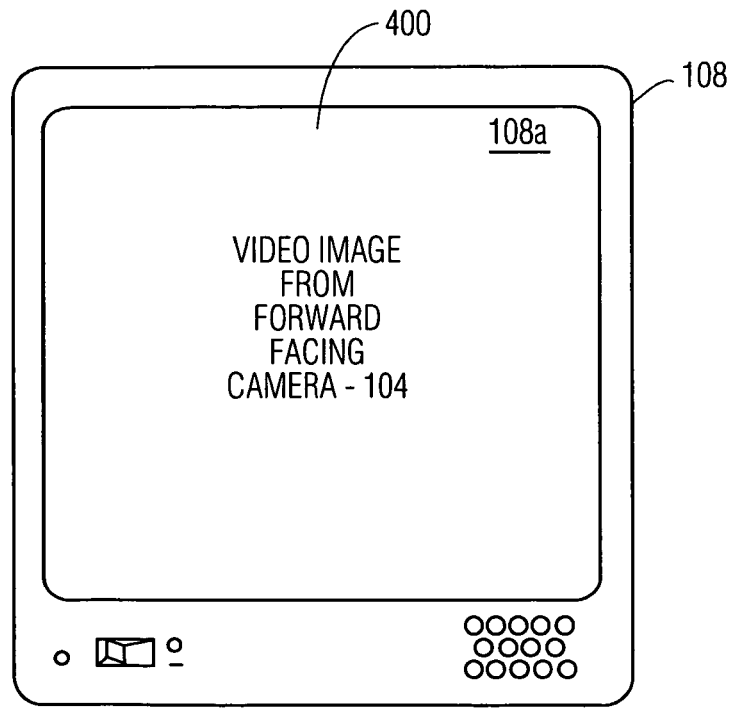
FIG. 5 illustrates the display surface of FIG. 4 wherein the video image data from the forward facing camera is selected for display on the display surface.

Referring now to FIGS. 4 and 5, apparatus 100 can further comprise selection means for selecting the display of video image data from one of the forward and rearward facing cameras 104, 106 for display on the display surface 108. FIG. 4 illustrates a side-by-side display 108a of video image data 400, 402 from the forward and rearward facing cameras 104, 106. Those skilled in the art will appreciate that the display surface 108 can display the video image data from several cameras, and that a two camera display 108a is shown by way of example only and not to limit the spirit or scope of the present invention. For instance, if side or top and bottom cameras were used on the secondary vehicle 102, the display 108a can be split into an appropriate number of display sections to display video images from each of the cameras used.

As with the control means discussed above, the selection means preferably comprises the display surface 108 having a touch screen capability, whereby touching the display 108a from one of the forward or rearward facing cameras selects the corresponding video image data 400, 402 for display on the display surface 108. Therefore, as is shown in FIG. 4, if the video image data 400 from the forward facing camera 104 is interesting to the user/driver, the user/driver can touch the portion of the display 108a on which the video image data 400 from the forward facing camera 104 is being displayed and, as is shown in FIG. 5, the display 108a will switch to displaying only the video image data 400 from the forward facing camera 104. The user/driver can then use the control means as discussed above to enhance a portion of the display 108a.

Referring back to FIG. 1, a second variation of the apparatus 100 of the present invention will now be discussed. In the second variation, a detecting and tracking means 116 is provided for detecting and tracking an emergency/law enforcement vehicle displayed on an indicated portion of the display surface 108. In the second variation, the detecting and tracking means 116 functions as the control means for controlling at least one of the pan, zoom, and tilt motors of the cameras 104, 106. Therefore, an identification means is used to indicate the portion of the display 108a which contains the emergency/law enforcement vehicle to be tracked. The identification means can be through a speech recognition system interface as discussed above or preferably by touching a portion of the display 108a which contains a suspected emergency/law enforcement vehicle, also as discussed above.

The detecting and tracking means 116 then detects the emergency/law enforcement vehicle in the indicated portion of the display, if present, and automatically and continuously tracks the location of the emergency/law enforcement vehicle in the video image data. Preferably, the detecting and tracking means 116 controls the pan, zoom, and tilt motors to maintain the detected emergency/law enforcement vehicle in the center of the display 108a, as is shown in FIG. 3. Systems for the detection and tracking of objects in video image data are well known in the art, such as those disclosed in Raja et al., *Segmentation and Tracking Using Colour Mixture Models*, Third Asian Conference on Computer Vision, Computer Vision ACCV '98 Proceedings, Vol. 1, Hong Kong China, January 1998 and Elgammal et al., *Non-parametric Model for Background Subtraction*, 6$^{th}$ European Conference on Computer Vision, Computer Vision-ECCV 2000 Proceedings, Part II, Dublin Ireland, June/July 2000, the disclosures of which are incorporated herein by their reference.

A third variation of the apparatus 100 of the present invention will now be discussed with reference to FIG. 1. In the third variation, apparatus 100 is supplemented with a classification means 118 for classifying vehicles in the displayed video image data and identifying those of the classified vehicles which are emergency/law enforcement vehicles. The tracking means 116 then tracks the identified emergency/law enforcement vehicle in the video image data and functions as the control means for controlling at least one of the pan, zoom, and tilt motors. Therefore, the user/driver no longer has to manually indicate, point to, or otherwise select any part of the display 108a to the apparatus 100 because the apparatus 100 has the capability to continuously monitor and classify approaching vehicles from either or both of the cameras 104, 106. Systems for the classification of objects in video image data are well known in the art, such as that disclosed in co-pending U.S. application Ser. No. 09/794,443 to Gutta et al., titled *Classification of Objects through Model Ensembles*, which is incorporated herein by its reference.

Once an emergency/law enforcement vehicle is identified/classified, the user/driver is alerted by an alerting means so the user/driver can take appropriate action, such as yielding the right of way, if necessary. The alerting means can be an audible and/or visual alarm operatively connected to one of the classification 118 or tracking means 116 either directly or through the central processor 110. The audible alarm can be a speaker 120, preferably connected to and integral with the display surface 108. The audible alarm can be a spoken warning or an alarm sound, such as a loud ringing or siren noise. As is known in the art, if the vehicle is equipped with a stereo system, the same can be controlled by the central processor 110 so as to mute or lower the volume of the same at the time of the audible alarm. The visual display can also take many forms including a flashing light on the display surface or dashboard or a textual message displayed on the display surface 108. Preferably, the alarm means comprises a simultaneous audible and visual alarm.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An apparatus for detecting an approaching emergency/law enforcement vehicle from a secondary vehicle, the apparatus comprising:
   at least one camera mounted on the secondary vehicle;
   a display surface mounted inside an interior of the secondary vehicle for displaying video image data from the at least one camera;
   at least one of a pan, tilt, and zoom motor operatively connected to the at least one camera for providing an enhanced view of an emergency/law enforcement vehicle displayed on the display surface; and
   control means for controlling the at least one pan, tilt, and zoom motors to provide the enhanced view.

2. The apparatus of claim 1, wherein
   all of the pan, tilt, and zoom motors are operatively connected to the at least one camera.

3. The apparatus of claim 1, wherein
   the at least one camera comprises forward and rearward facing cameras, each of which are operatively connected to a pan, tilt and zoom motor, and each of which have a control means for controlling their respective pan, tilt, and zoom motors.

4. The apparatus of claim 3, further comprising
   selection means for selecting the display of video image data from one of the forward and rearward facing cameras for display on the display surface.

5. The apparatus of claim 4, wherein
   both the video image data from the forward and rearward facing cameras are displayed together on the display surface and wherein the selection means comprises a touch screen whereby touching the display from one of the forward or rearward facing cameras selects the corresponding video image data for display on the display surface.

6. The apparatus of claim 1, wherein
   the control means comprises a touch screen whereby touching a portion of the display surface controls at least one of the pan, tilt, and zoom motors to provide an enhanced view of the portion touched.

7. The apparatus of claim 1, wherein
   the control means comprises a speech recognition and command system for recognizing a spoken command by a user and for controlling at least one of the pan, tilt, and zoom motors accordingly.

8. The apparatus of claim 1, further comprising:
detecting and tracking means for detecting and tracking an emergency/law enforcement vehicle displayed on an indicated portion of the display surface,
said detecting and tracking means further functioning as the control means for controlling at least one of the pan, zoom, and tilt motors; and
identification means for indicating the portion of the display surface which contains the emergency/law enforcement vehicle to be tracked.

9. The apparatus of claim 8, wherein
the identification means comprises a touch screen whereby touching a portion of the display surface indicates the portion of the display which contains the emergency/law enforcement vehicle to be tracked.

10. The apparatus of claim 1, further comprising:
classification means for classifying vehicles in the displayed video image data and identifying those of the classified vehicles which are emergency/law enforcement vehicles; and
tracking means for tracking the identified emergency/law enforcement vehicle in the video image data,
said tracking means further functioning as the control means for controlling at least one of the pan, zoom, and tilt motors.

11. The apparatus of claim 10, further comprising
means for alerting a user of the secondary vehicle that at least one emergency/law enforcement vehicle has been identified in the video image data.

12. The apparatus of claim 11, wherein
the means for alerting the user comprises an audible alarm operatively connected to one of the classification or tracking means.

13. The apparatus of claim 11, wherein
the means for alerting the user comprises a visual alarm operatively connected to one of the classification or tracking means.

* * * * *